United States Patent [19]

Spencer

[11] Patent Number: 6,113,962

[45] Date of Patent: *Sep. 5, 2000

[54] PRESERVATION OF COLOR OF STORED MEAT USING NOBLE GASES

[75] Inventor: Kevin C. Spencer, Riverside, Ill.

[73] Assignee: American Air Liquide, Walnut Creek, Calif.

[ * ] Notice: This patent is subject to a terminal disclaimer.

[21] Appl. No.: 08/291,741

[22] Filed: Aug. 17, 1994

Related U.S. Application Data

[63] Continuation of application No. 07/846,809, Mar. 5, 1992, abandoned.

[51] Int. Cl.$^7$ .............................. A23B 4/03; A21D 10/02; A21D 4/00; A23L 1/222
[52] U.S. Cl. .................. 426/316; 426/129; 426/654; 426/574; 426/324; 426/331; 426/332; 426/263; 426/264; 426/392; 426/395; 426/404
[58] Field of Search ................................ 426/654, 652, 426/574, 129, 118, 316, 324, 327, 331, 332, 262, 263, 264, 392, 395, 404, 448

[56] References Cited

U.S. PATENT DOCUMENTS

| | | |
|---|---|---|
| 3,096,181 | 7/1963 | Dixon et al. . |
| 3,183,171 | 5/1965 | Schreiner . |
| 3,677,024 | 7/1972 | Segall ........................ 426/524 |
| 4,522,835 | 6/1985 | Woodruff et al. ........................ 426/264 |
| 4,642,239 | 2/1987 | Ferrar et al. ............................ 426/129 |
| 4,812,320 | 3/1989 | Ruzek ..................................... 426/129 |
| 4,919,955 | 4/1990 | Mitchell .................................. 426/129 |

FOREIGN PATENT DOCUMENTS

| | | |
|---|---|---|
| 0 289 777 | 11/1988 | European Pat. Off. . |
| 0 346 201 | 12/1989 | European Pat. Off. . |
| 2 013 177 | 3/1970 | France . |
| 2 089 899 | 1/1972 | France . |
| 2 133 502 | 12/1972 | France . |
| 3 446 829 | 7/1986 | Germany . |
| 3 734 025 | 4/1989 | Germany . |

OTHER PUBLICATIONS

Chemical Abstracts, vol. 108, No. 9; abstract No. 74017f; see abstract & JP, A, 62 224 233 (Idemitsu Petrochemical Co. Ltd).

Database WPIL, Derwent Publications Ltd., London, GB; AN 85–181496; & JP,A, 60 110 663 (Kureha Chem. Ind. KK) see abstract.

Database WPI, Derwent Publications Ltd., London GB; AN 80–72434C & JP,A,55 111 755 (Kyodo Gas KK) Aug. 29, 1980 see abstract.

Database WPIL, Derwent Publications Ltd., London, GB: AN 85–181496 & JP,A,60 110 663 (Daio KK) 11/88; cited in the application; see abstract.

Database WPI, Derwent Publications Ltd., London, GB; An 77–73631 & JP,A, 52 105 232 (Teikoku Sanso KK) 9/77; cited in the application; see abstract.

Patent Abstracts of Japan, vol. 8, No. 30 (C–209) 2/84; & JP,A,58 193 651 (Kawai Masao) 11/83 see abstract.

Schweizerishche Milchwirtschaftlicheforschung, vol. 21, No. 1, 1992, pp. 6–11; Collomb et al. 'Optimisation des conditions d'entreposage des enchantillons de fromage en laboratoire á L'aide d'analyses chimiques'.

*Primary Examiner*—Anthony J. Weier
*Attorney, Agent, or Firm*—Oblon, Spivak, McClelland, Maier & Neustadt, P.C.

[57] ABSTRACT

A process for preserving the color of red meat, which entails contacting the meat with an effective amount of an atmosphere selected from the group consisting of a noble gas, a mixture of noble gases and a mixture containing at least one noble gas and a carrier gas, the noble gas in the mixture with the carrier gas being selected from the group consisting of argon, neon, xenon an krypton and being present in said mixture in an amount of greater than about 10% by volume.

25 Claims, 13 Drawing Sheets

PRESERVATION OF COLOR OF STORED MEAT USING NOBLE GASES

This application is a Continuation of application Ser. No. 07/846,809, filed on Mar. 5, 1992, now abandoned.

BACKGROUND OF THE INVENTION

1. Field of the Invention

The present invention relates to a method of preserving the color of stored meat using noble gases.

2. Description of the Background

Meat products, such as beef, veal lamb, mutton and pork are susceptible to a variety of degradative processes. For example, they are susceptible to attack by bacteria. Meat products are also quite susceptible to enzymatic degradation. For example, fats in meat products are readily hydrolyzed to fatty acids, which are, in turn, oxidized to produce a rancid odor. Further, proteins in meat products generate various nitrogen-containing compounds upon spoilage, such as ammonia and amino-group containing compounds which are characterized by a pungent and unpleasant odor.

At present, a variety of methods are known for preserving meat products in order to preserve the same from spoilage. However, such methods are generally neither intended nor designed to preserve the color of red meat, and/or generally entail complex process schemes, which tend to be commercially impractical.

For example, Japanese Patent Application No. 52-27699 discloses a method of treating frozen food which entails i) freezing livestock, marine and agricultural products in an isotropic press state at more than atmospheric pressure; ii) preserving these products at atmospheric pressure by freezing and refrigerating; and iii) heating and thawing these products in an isotropic press state at more than atmospheric pressure in order to eat the same. In this process, the freezing of products under pressure is described as being essential in order to preclude breakage of cell walls in the product being preserved. A similar rationale is set forth for thawing under pressure.

U.S. Pat. No. 4,946,326 describes the use of a gas mixture containing carbon dioxide, oxygen and argon to extend the shelf-life of fresh fish or sea food products at low temperature. However, this patent does not pertain to preserving of the color of red meat.

U.S. Pat. No. 4,522,835 describes a process for preserving color in meat, poultry and fish products, which entails i) reducing the products to change the red oxymyoglobin on or below the surface thereof to visually-perceptible purple myoglobin, and then ii) subjecting the products to an atmosphere containing from 0.10% to 3% by volume of carbon monoxide to convert the visually-perceptible purple myoglobin to visually-perceptible red carboxymyoglobin to a specified depth below the product surface. Thus, this process requires the use of a reduction step and then uses hazardous carbon monoxide to treat the products in a subsequent step.

Further, Japanese patent 77027699 discloses a process for maintaining the flavor of food by necessarily freezing and storing the food under pressure by introducing carbon dioxide, nitrogen, argon and hydrogen. However, this patent clearly does not address the deterioration of meat color that attends the use of conventional methods of meat preservation.

Generally, a description of controlled/modified atmosphere/vacuum packaging of foods is provided by A. L. Brody. See Controlled/Modified Atmosphere/Vacuum Packaging of Foods. Food and Nutrition Press, Inc.

Additionally, various methods have been advanced for the use of mixed gases to prevent the growth of anaerobic bacteria and mold.

For example, Japanese patents 52105232 and 80002271 both disclose the packaging of food to prevent spoilage by mold growth and anaerobic bacteria, respectively, using a mixture of argon and carbon dioxide. Also, Japanese Patent No. 1,059,647 describes the use of a mixture of argon and carbon dioxide to prevent the growth of mold. However, none of these patents addresses the deterioration of meat color.

EPA 422,995 discloses a method to preserve fresh food products such as fruit or vegetables comprising two steps: an initial step wherein the said products are refrigerated in a gaseous atmosphere comprising 10% to 100% of nitrous oxide and/or argon, but without oxygen followed by a second step wherein the products are maintained at about the same refrigerated temperature in an atmosphere comprising from 2% to 20% oxygen.

EPA 289,777 discloses the preservation of cut and segmented fresh fruit pieces in a container wherein the container is flushed with an oxygen-containing gas mixture, having preferably between about 5 and 50% oxygen and the rest being inert gases such as nitrogen, helium, argon and hydrogen. No description or suggestion is made in this patent application regarding the preservation of the color of red meat.

French Patent 1,339,669 discloses a stabilization process of products which might be altered by air during the treatment or storage thereof in closed containers. The products are particularly biological products, such as those used in human or veterinary medicine. This process is characterized by the fact that the products are maintained in the presence of a rare gas atmosphere, preferably argon. However, there is neither a description nor a suggestion in this patent regarding the preservation of meat color. Kocys and Venskevicius (1970) Mokslas Tech. 11:60–1. Chu et al. (1987) J. Food Sci 52:869–75, are studies of color stability of frozen beef under nitrogen and describe some typical inadequacies of this treatment, but neither describe nor suggest any improvements.

GB 1,392,580 discloses the packaging of fresh meat in a first oxygen-permeable layer, with a second oxygen-impermeable layer thereon, so that when packed in an inert atmosphere, the product remains isolated from oxygen until the impermeable layer is removed. The dual packaging extends the shelf-life of the meat.

U.S. Pat. No. 3,102,819 describes a method of tenderizing freshly slaughtered meat, which entails immersing the meat in a liquid nitrogen bath, pulverizing the embrittled meat in a gaseous nitrogen atmosphere, molding the meat into a slab, raising the temperature to coalesce the slab and then freezing the slab again for storage and shipment.

U.S. Pat. No. 4,919,955 discloses a method for processing fresh meat, which like U.S. Pat. No. 3,102,819, entails several complex processing steps.

Despite the existence of various methodologies for extending the shelf-life of fresh meat, none of these affords a means by which the color of red meat or meat products may be preserved in a commercially practical manner.

Therefore, a need exists for a means by which the color of red meat or meat products may be preserved in a commercially practical manner.

SUMMARY OF THE INVENTION

Accordingly, it is an object of the present invention to provide a method of preserving the color of red meat products.

Moreover, it is a particular object of the present invention to preserve the color of stored red meat or meat products using noble gases.

Accordingly, the above objects and others are provided by a process for preserving the color of stored red meat or meat products, which entails contacting the meat or meat products with a noble gas, or a mixture of noble gases or a noble gas-containing mixture or a combination thereof, which entails at least one noble gas, at a concentration of noble gas which is greater than that normally found in atmospheric air.

DETAILED DESCRIPTION OF THE PREFERRED EMBODIMENTS

Figure 1:
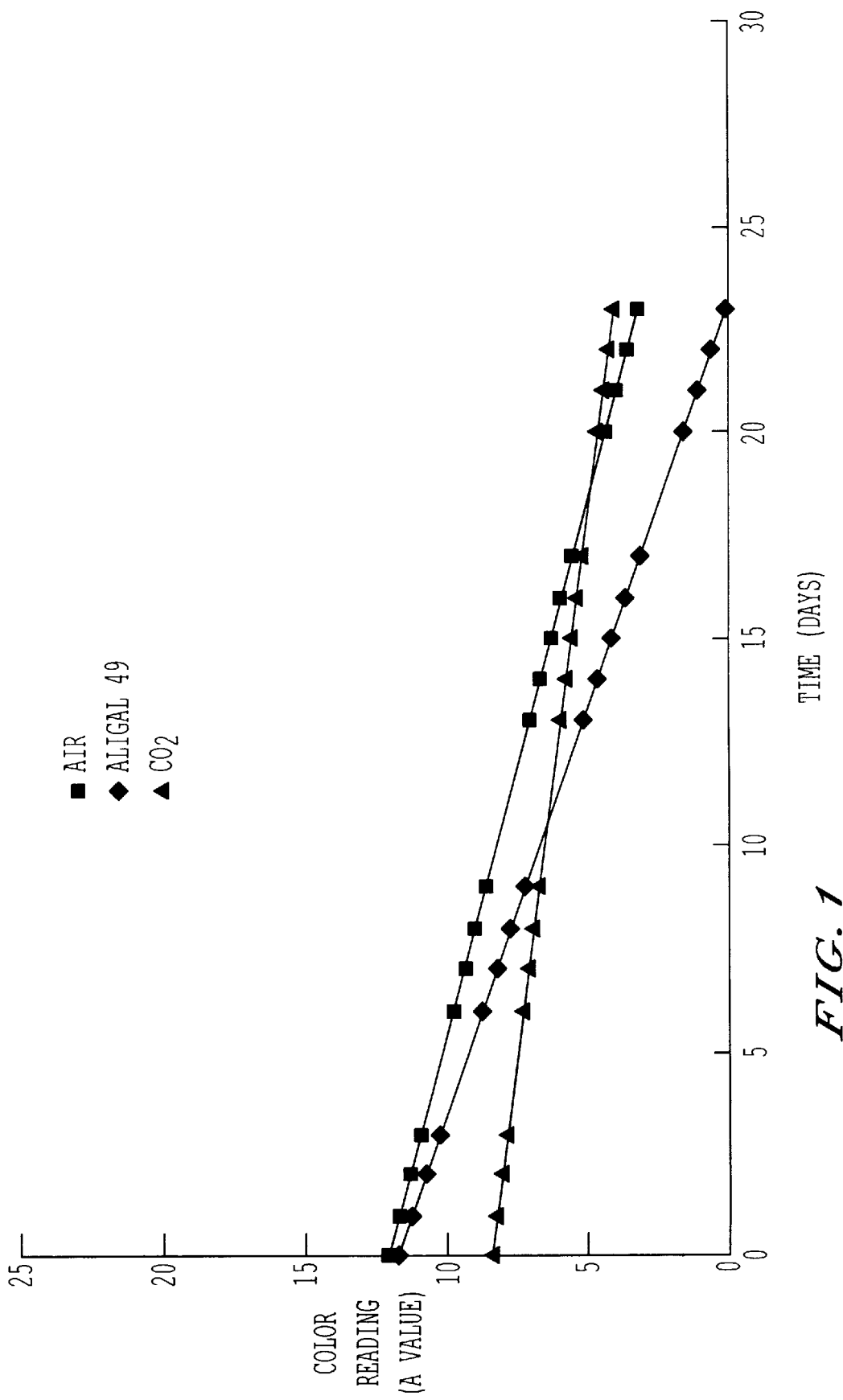
FIG. 1 shows the poor color (Hunter a values) observed in $CO_2$-packaged fresh retail-cut meat, and the effects of oxidation reactions which are responsible for the degeneration of oxygen-red meat. Aligal 49 (by volume, 66% $O_2$, 25% $CO_2$, 9% $N_2$) and air both cause degenerative oxidation, and as direct result of its increased oxygen content (3× that of air), Aligal 49 causes more degeneration. (Regressed data).

In accordance with the present invention, it has been discovered that by contacting meat or meat products with an atmosphere enriched in at least one noble gas during any manipulative stage of processing, it is possible to surprisingly preserve the color of the meat or meat products, thereby improving the color of the meat or meat products when eventually consumed. In particular, the present invention may be used to great advantage in the processing, packaging, storage or display of red meat or meat products. Generally, the present invention entails contacting the meat or meat products with gaseous and/or liquid forms of the noble gases, noble gas-mixtures or noble gas-containing mixtures during any or all manipulative stages of processing.

In accordance with the present invention, the term "red meat" or "red meat product" means any meat or meat product having a red color when freshly cut. The term "red" may be understood using the USDA standards described hereinbelow. Such red meat or meat product may include, for example, beef, pork, veal, lamb or mutton or products thereof. By the term "product" is meant any cut, sliced, packaged or generally processed piece of red meat. Any such meat may be preserved using the present invention.

Furthermore, every aspect of the present invention as described above and hereinbelow is applicable to ground meat and/or meat products, such as ground beef. For example, the meant and/or meat products may be ground under a liquid noble gas, liquid noble gas-mixture or liquid noble gas-containing mixture. OR, the meat and/or meat products may be ground under a gaseous noble gas, gaseous noble gas-mixture or gaseous noble gas-containing mixture. Also, the meat and/or meat products may be ground under atmospheric air and then subjected to the liquids and gases described above.

In more detail, the meat or meat product may be treated at any stage of processing using the gases of the present invention. For example, it has been found that by freezing or packaging red meat or red meat products under noble gas-containing mixtures that the color quality can be increased up to 25% and the length of color preservation can be extended by up to 10 times.

As noted above, the present inventions may be used to advantage in any and/or all of the following steps: processing, packaging, storage and/or display of red meats or red meat products.

Packaging is optimally a thin polymer film applied to and surrounding the meat, which may or may not include a tray, or the sealing of meat in a pouch or bag by any means, or in any other sealable container, wherein the essential component of such film, pouch, bag or container is that it is essentially impermeable to gas, particularly impermeable to argon or another noble gas. However, a semipermeable film may be used when the rate of exchange of noble gases, $O_2$ and $CO_2$ is favorable toward the maintenance of the desired atmosphere within the package.

Furthermore, the present invention specifically contemplates the use of either the gaseous and/or liquid forms of the noble gases, noble gas-mixtures and/or noble gas-containing mixtures in any combination for the above steps. Thus, for example, the liquid form of these treatment gases may be used in certain steps such as processing, while the gaseous form may be used for packaging, storage or display. The present invention also specifically contemplates the use of noble gases, noble gas mixtures and/or noble gas-containing mixtures in any combination introduced into solution in liquids which are then applied to the meat, such as in a chilling bath for meats.

For example, in accordance with the present invention the noble gases, noble gas mixtures and/or noble gas-containing mixtures may be introduced into water or aqueous solutions containing salt or other known flavoring substances or tenderizers at ambient or below ambient temperatures. Generally, however, when using such solutions, it is preferable to utilize the same at a chilled temperature, such as from about 15° C. to about 0° C.

While the present invention may be used to advantage with any red meat or red meat product, it is used to particular advantage with beef.

Generally, in accordance with the present invention, it has been discovered that a surprising improvement in the color of red meat or red meat products is obtained if the meat or meat product is subjected during any manipulative step, such as processing, packaging, storage or display to an atmosphere which contains a noble gas content, such as argon, which is greater than that normally found in air. For example, argon is generally accepted as being present in the atmosphere in the amount of about 0.934% by volume. While neon, krypton and xenon are normally present in the atmosphere in amounts of $1.82 \times 10^{-3}$, $1.14 \times 10^{-3}$ and $8.7 \times 10^{-6}$, respectively, by % volume. *Advanced Inorganic Chemistry,* Cotton and Wilkinson (Third Edition, Wiley). Thus, for purposes of the present invention, any amount of noble gas may be used which is greater than that found in atmospheric air. For argon, this amount is preferably at least 1% by volume, and is more preferably in excess of 1% by volume for argon.

For neon, krypton and xenon amounts generally used are at least about 0.05% each, by volume. However, it is generally preferred that the amounts of neon, krypton and xenon used be greater than about 0.1% each, by volume.

Thus, in general, any gas, mixtures of gases, liquid or mixtures of liquids may be used in accordance with the present invention as long as they contain an amount of at least one noble gas as described above. Preferably, however, they contain at least the preferred amounts noted above.

However, it is even more preferred to use mixtures of argon and nitrogen gas, for example, in relative amounts of between about 10:90 and 90:10, respectively, in volume %. Further, it is also preferred to use mixtures of argon and other noble gases, such as xenon, krypton and/or neon, in relative amounts of from 99.9:0.1 to 0.1 to 99.9, respectively, in volume %, for example. However, any combination of relative amounts within this range may be used such as 95:5, 90:10, 85:15, respectively, in volume %. Nevertheless, it is preferred to use relative amounts of about 90:10, respectively, in volume %.

Generally, it is most preferable to use gaseous atmospheres or liquids containing amounts of argon of 25 volume % or more, and more preferably amounts of 50 volume % or more. It is more preferable still to use amounts of argon of 90 volume % or more and even 100% by volume. For amounts of less than 100% by volume, excellent results are obtained in the presence of nitrogen, helium, or any other inert gas, oxygen or even air.

However, when mixtures of argon and carbon dioxide or of argon and oxygen are used, it is generally preferred to use 50% by volume or less of carbon dioxide in argon. For example, mixtures having relative amounts of argon/carbon dioxide or of argon/oxygen of 70:30, 80:20, 90:10 or 95:5, respectively, in volume %, or argon/(oxygen+carbon dioxide) of 70:30, 80:20 or 95:5 whatever the proportion of oxygen and carbon dioxide is, are advantageous.

This is because the reactive gases $CO_2$ and $O_2$ have deleterious effects on color in addition to conferring certain desirable effects.

As indicated above, any combination of liquid and gaseous forms of noble gases may be used with various combinations of manipulative process steps. For example, the following exemplifications are only illustrative and are not intended to be limitative.

A. The red meat or meat product is frozen cryogenically using liquid argon, and is then maintained in storage under an argon or argon-containing atmosphere to afford excellent preservation and maintenance of color.

B. The red meat or meat product is frozen cryogenically using a mixture of liquid argon and liquid nitrogen (for example, in the amount of 10:90 to 90:10, respectively, in volume %) and is then maintained under an argon or argon-containing atmosphere to afford excellent preservation and maintenance of color.

C. The red meat or meat product is frozen cryogenically using liquid argon or liquid argon-containing mixture (such as argon and/or nitrogen, and/or oxygen, and/or carbon dioxide and/or air, and/or other noble gases or any combination thereof) or the meat or meat product is saturated with argon from gaseous argon or gaseous argon-containing atmosphere, and then the meat or meat product is vacuum-packaged, such that argon remains dissolved in or bound to the meat or meat product to afford excellent preservation and maintenance of color.

D. Cut red meat or meat products are mechanically frozen (i.e., refrigeration) under gaseous argon or a gaseous argon-containing mixture to afford excellent preservation and maintenance of color.

E. The red meat or meat products are gas-packaged under gaseous argon or a gaseous argon-containing mixture to afford excellent preservation and maintenance of color.

F. The imposition of the argon or argon-containing atmosphere is coincident with cryogenic freezing, wherein the boiling liquid from the freezing treatment is used to fill the gas package.

G. The gas packaging of the red meat or meat product is coincident with the mechanical freezing process wherein the package is sealed within the freezer containing the argon or argon-containing atmosphere, or before or after cessation of freezing using the same or similar atmosphere.

In accordance with the present invention, it has been discovered that it is generally unnecessary to use high pressures when treating the meat or meat products with gaseous atmospheres. In fact, packaging of the meat or meat products under pressure only serves to enhance the degree of saturation of the effective gas to the limit of practicality established by the sensitivity of the meat or meat products to pressure damage. Generally, damage is observed at any pressure above 1 atm. for refrigerated meats, and, thus, pressure is of use only in ensuring or maintaining contact between the meat or meat product and the effective atmosphere. When used it is generally preferred that the application of pressure be only for a time sufficient to maximally saturate the meat with the effective atmosphere. This may readily be done using conventional methodologies.

Generally, damage occurs as soon as the pressure of the atmosphere surrounding the meat is higher than the atmospheric pressure (1 atm. absolute). It is to be understood, however, that the atmospheric pressure, depending on the local conditions, is not exactly 1 atm., but 1 atmosphere±a few percent at most. IT is, therefore, to be understood that the above reference to a pressure of 1 atm. has the meaning of usual atmospheric pressure which means 1 atmosphere±a few percent.

Thus, in general, when gaseous forms of effective atmospheres are used, pressures may be used from a very low pressure of about $10^{-6}$ torr up to about 3 atmospheres. However, typically, pressures of about $10^{-3}$ torr to about 2 atmospheres may be used. It is preferred, however, that pressures of about 0.5 atm. to about 1.5 atm. be used. It is most preferred, however, if pressures on the order of about 1 atmosphere (i.e., normal for wherever the locus of treatment is) are used.

Further, the temperature of treatment may either be the temperature of the liquid form of the effective atmosphere being used or in the case of gaseous forms a temperature from about $-10°$ C. to about ambient temperature may be used. However, it is preferred that temperatures from about $4°$ C. to about ambient temperature, i.e., about $20°$ C. to $25°$ C. be used.

Additionally, although a range of temperatures may be used for each of the manipulative processing steps, it is particularly noteworthy that the effects of the present invention may be obtained even at ambient temperature. Thus, in accordance with the present invention, any manipulative processing step including storage may be conducted at ambient temperature, including storage.

In practicing the various manipulative steps for preparing meat or meat products, such as processing, packaging, displaying or storing, conventional manipulative steps may be used in conjunction with the present invention.

For example, in modern meat processing, (Romans, J. R., et al., The Meat We Eat, 12th ed., Interstate Publ., 1985), it is noted that cattle are slaughtered, bled, skinned, eviscerated, the carcasses are split, washed, chilled and boned. Alternatively, the carcasses may be boned before chilling. Meat is cut into primal cuts and packaged on site at most modern plants. For retail display, the meat is trimmed, deboned, wrapped, and/or boxed. The latter treatments are generally finished at the point of sale, but may also be performed at the packing plant. Therefore, ordinarily, the meat is shipped as wrapped primal cuts, often aged from 0 to 30 days, and trimmed and rewrapped at the retailer. Over 40 billion pounds per year of carcasses are processed in the U.S. alone.

Further exemplification of the application of the present invention are as follows. It is noted, however, that these examples are provided only for purposes of illustration and are not intended to be limitative.

1. At the point of preparation of retail display packages. Currently meat is hand-trimmed, placed on a styrofoam or other tray, and wrapped in impermeable film. Exposure to oxygen in air during the process allows for red color. Spoilage parameters are controlled through refrigeration.
2. At the point of preparation or storage of primal (wholesale) cuts. The cut is washed, chilled, and vacuum-packaged in impermeable film. The mode of preservation is by refrigeration and vacuum packaging.
3. At the point of freezing. Pieces sent as frozen meat are frozen cryogenically, then are ordinarily vacuum packaged (cryovac process). Alternatively, meat is frozen in mechanical freezers, then packaged.
4. At any step where meat is chilled as fresh pieces in air. For example, during carcass storage for aging or mechanical chilling. Preservation is by chilling.
5. At any step where meat is chilled by immersion in a liquid bath. For example, where most carcasses are chilled by immersion prior to, or immediately after, boning. Preservation is by chilling/washing.
6. During shipment, aging, or long-term refrigerated storage. For example, when shipped either as hanging carcasses or more ordinarily as wrapped and boxed primal cuts in refrigerated boxcars or semitrailer trucks.

A significant benefit may be obtained by the use of the present invention in each and all of the processing steps noted above.

For example, at point 1, gas-packaging significantly increases the color quality and longevity of color of the displayed meat, thereby increasing its value and shelf-life.

At point 2, primal cuts may be prepared under a noble-gas containing atmosphere to advantage, or such an atmosphere may be imposed into the packaging after vacuum packaging, or the meat may preferably be gas-packaged under such an atmosphere, all with the effect of increasing color quality and preservation.

At point 3, primal cuts may be frozen in cryogenic liquid containing noble gases, preferably 90:10 liquid nitrogen: liquid argon, or may be mechanically frozen under a noble gas-containing atmosphere, and may further be packaged as above. This mode of application produces significant improvement and preservation of color.

At point 4, the meat may be exposed to and maintained in a noble gas-containing atmosphere which improves color.

At point 5, addition and preferably saturation of the chilling liquid with noble gas-containing mixtures, and/or superimposition of such an atmosphere above a chilling bath significantly improves color and its preservation in meat so treated.

At point 6, shipping in packages containing noble gas-containing mixtures, or shipping in boxcars or trailers containing such an atmosphere, significantly improves color quality and preservation.

Furthermore, it is specifically contemplated that vacuum techniques which are conventional may be practiced in conjunction with any aspect or aspects of the present invention. Thus, in subjecting the meat or meat products of the present invention to a gas, gas mixture, liquid or liquid mixture of the present invention, it is specifically contemplated that vacuuming may be practiced either before or after each manipulative step.

For example, the present invention may be practiced by cryogenically freezing the meat or meat product with a first liquid or liquid mixture containing at least one noble gas at a concentration greater than that found in atmospheric air. Then, the frozen meat or meat product may be subjected to vacuum conditions, if desired, and then stored or displayed under a gaseous atmosphere containing at least one noble gas in an amount greater than that found in atmospheric air, but which composition is different than the composition of the liquid mixture used to freeze the meat or meat product. Thus, different compositions of gases or liquids may be used for different manipulative processing steps, and also in conjunction with conventional vacuum techniques.

Having described the present invention, reference will now be made to certain examples which are, again, provided solely for purposes of illustration and are not intended to be limitative.

EXAMPLE

Tests were made with red meat which was cut fresh or cut from cryovac packages blanketed under either air, argon or nitrogen, or taken from retail display packages. Optimal results were obtained when the entire processing was done under controlled atmosphere and argon was superior to nitrogen. In one basic experiment, 29 separate contact treatments were performed in which the fresh meat was placed in cryogenic liquid and frozen, or was frozen in a mechanical freezer, or was simply refrigerated, each then being packaged under a treatment atmosphere, then chilled and allowed to thaw or kept frozen.

Meat color was also measured using a Hunter Associates Laboratory Miniscan MS4500-L wide-are view calorimeter (Hunter, P. S. 1973. The measurement of appearance. Hunter Associates Laboratory, Inc., Fairfax, Va.; Francis, F. J. and F. M. Clydesdale. 1975. Food colorimetry: theory and practice. Avi Publ. Co., Inc.; Eagerman, B. A., F. M. Clydesdale and F. J. Francis. 1977. Determination of fresh meat color by objective methods. J. Food Sci. 42: 707–710.).

Readings were made in statistically adequate replicates of Hunter "L" (luminosity=lightness of color, 100=white, 0=black), Hunter "a" (redness-greeness chromaticity= desirable red color, red=+, grn.=−), and Hunter "b" (yellowness-blueness chromaticity, yel.=+, bl.=−). These colors correspond directly with consumer perceptions of meat product quality and acceptability, and together objectively define the overall meat color.

Basically, the bright red color of meat is a result of the conversion of the normally reduced form of myoglobin to oxymyoglobin. Deterioration processes (reducing) convert this desirable form to undesirable (brown) metmyoglobin. Further, aging under oxygen can result in oxidative deterioration of the myoglobins to undesirable moieties. In commercial practice, these dynamic generation/degeneration cycles depend strongly upon the introduction of oxygen: where in the process it is introduced to the meat, when and for how long it is exposed, how much oxygen (stoichiometrically) is in contact with myoglobins. Other globins such as hemoglobin are also important, as are salt and metal concentrations, enzymatic and other chemical events, and microbial growth.

Generally, cutting or storing of fresh meat under nitrogen offers no significant improvement in the preservation of color. By contrast, in accordance with the present invention noble gases, noble gas mixtures and noble gas-containing mixtures exert a superior effect upon color and its preservation in red meat and red meat products.

Table I summarizes the treatments for one replicate of an experiment testing the effects of freezing method and packaging atmosphere in combination. In the caption, "Mech" indicates mechanical freezing, "l" indicates cryogenic treatment with liquefied gas, "g" indicates packaging in impermeable polymer pouches under gas and combinations of treatments are indicated by a "+" sign. The results of these and similar and replicate manipulations are presented in FIGS. 1–13.

Table II summarizes the treatments for one replicate of an experiment comparing different quantitative mixtures of noble gas-containing atmospheres used in simple gas-packaged chilled storage. The results of these and similar treatments are presented in FIGS. 1–9.

TABLE I

Treatments used in one example test of color quality of red meat for frozen, frozen then thawed, and refrigerated samples. "1" = liquid (cryogenic freezing), "g" = gas, "mech" = mechanical freezing.

| Freezer | Thawed | Refrigerator |
| --- | --- | --- |
| 2 N2 1 + Ar g | 1 N2 1 + Ar g | 22 N2 g |
| 4 (90:10 N2:Ar)1 + Ar g | 3 N2 1 + Ar g + 02 g | 23 N2 g + 02 g |
| 6 (90:10 N2:Ar)1 + Ar g + 02 g | 4 (90:10 N2:Ar)1 + Ar g | 25 Ar g |
| 8 Ar 1 + Ar g | 6 (90:10 N2:Ar)1 + Ar g + 02 g | 26 Ar g + 02 g |
| 10 Ar 1 + Ar g + 02 g | 8 Ar 1 + Ar g | 27 CO2 g |
| 12 N2 1 + N2 g | 10 ar 1 + Ar g + 02 g | 29 CO2 1 + CO2 g + 02 g |
| 13 N2 1 + N2 g + 02 g | 12 N2 1 + N2 g | 30 Ar 1 + Ar g |
| 14 Mech N2 g | 13 N2 1 + N2 g + 02 g | 32 Ar 1 + Ar g + 02 g |
| 15 Mech N2 g + 02 g | 14 Mech N2 g | 34 (90:10 N2:Ar)1 + Ar g |
| 16 Mech Ar g | 15 Mech N2 g + 02 g | 37 (90:10 N2:Ar)1 + Ar g + 02 g |
| 18 Mech Ar g + 02 g | 17 Mech Ar g | 38 N2 1 + Ar g |
| 19 CO2 1 + CO2 g | 18 Mech Ar g + 02 g | 40 N2 1 + Ar g + 02 g |
| 20 CO2 1 + CO2 g + 02 g | 19 CO2 1 + CO2 g | 41 N2 1 + N2 g |
| | 21 CO2 1 + CO2 g + 02 g | 42 N2 1 + N2 g + 02 g |

TABLE II

Beef Top Sirloin Refrigerated Samples Treatments for Example Experiment

22 N2 g

23 N2 g

25 Ar g

26 Ar g

27 CO2 g

29 CO2 1

30 Ar 1

32 Ar 1

34 (90:10/$N_2$:Ar)1+Ar g 37 (90:10/$N_2$:Ar)1+Ar g+$O_2$g

38 N2 1

40 N2 1

41 N2 1

42 N2 1

As may be seen in Table I, one sample for each of 14 treatments was frozen, one frozen then thawed, and one gas-packaged and chilled. All unfrozen samples were stored for 30 days chilled, and frozen samples were kept up to 365 days. Further, some samples were maintained at room temperature. In other replicates, other mixtures were used including atmospheres containing xenon, krypton, neon, helium and several air or nitrogen controls. Also used was "Aligal 49", an American Air Liquide tradename mixture (66% $O_2$, 25% $CO_2$ and 9% $N_2$, by volume) used currently in gas-packaging of red meat.

Color was measured by five different observers each of whom used an identical computer-generated color scale for comparison with the meats. This chart shows 1,000 shades of color grouped into shade categories, and was calibrated against a USDA standard color scales. In general, very good agreement among the observers resulted from comparison of their independent estimations. Color was also measured using a Hunter Miniscan MS 4500-L wide area view calorimeter.

Graphs of example results obtained for frozen, thawed and refrigerated meats from the multiple replicate experiments represented in Table I are given in FIGS. 1–13. The results for the multiple refrigerated gas-packaging experiments represented in Table II are given in FIGS. 1–9. Many additional experiments were conducted. All values shown are significant ($p \leq 0.05$) as are all regressions (linear, $r \geq 0.95$).

The results from the example of Figure I show that cryogenic freezing with argon or mechanical freezing under an argon atmosphere provides superior color retention than similarly using nitrogen or carbon dioxide. The use of carbon dioxide always resulted in the poorest color of meat, however applied and however the meat was stored. While cryogenic freezing in nitrogen was better than $CO_2$, the color was not as good as when argon was used. Argon always provided superior results in terms of color. The resulting improvement in color preservation for frozen meats was most readily observed when gas-blanketed mechanical freezing was used. Here, the order of improvement was in general:

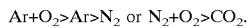

$Ar+O_2 > Ar > N_2$ or $N_2 + O_2 > CO_2$.

Mixtures of argon and xenon, krypton or neon gave excellent results as did these gases alone or in mixture with other gases as above.

For meats thawed after freezing, the color improvement is clearly caused by the noble gas, argon. Cryogenic freezing in Ar followed by gas packaging in $Ar+O_2$ afforded the best results, followed closely by about a 9:1 mixture of liquid nitrogen and liquid argon instead of the noble gas alone as used above. Next, in quality, but also excellent were cryogenic argon with gas packaging in argon, and the 9:1 mix followed by gas packaging in argon. Finally, excellent results were also obtained with mechanical freezing under argon with or without the addition of oxygen. Freezing with nitrogen gave intermediate results, and $CO_2$ gave poor results.

The addition of oxygen clearly improves color especially when air, carbon dioxide or nitrogen are present. This improvement, however, is short-lived. This can be useful particularly in freezing, but can limit color longevity when used with noble gases in refrigerated storage due to increased oxidation.

Figure 5:
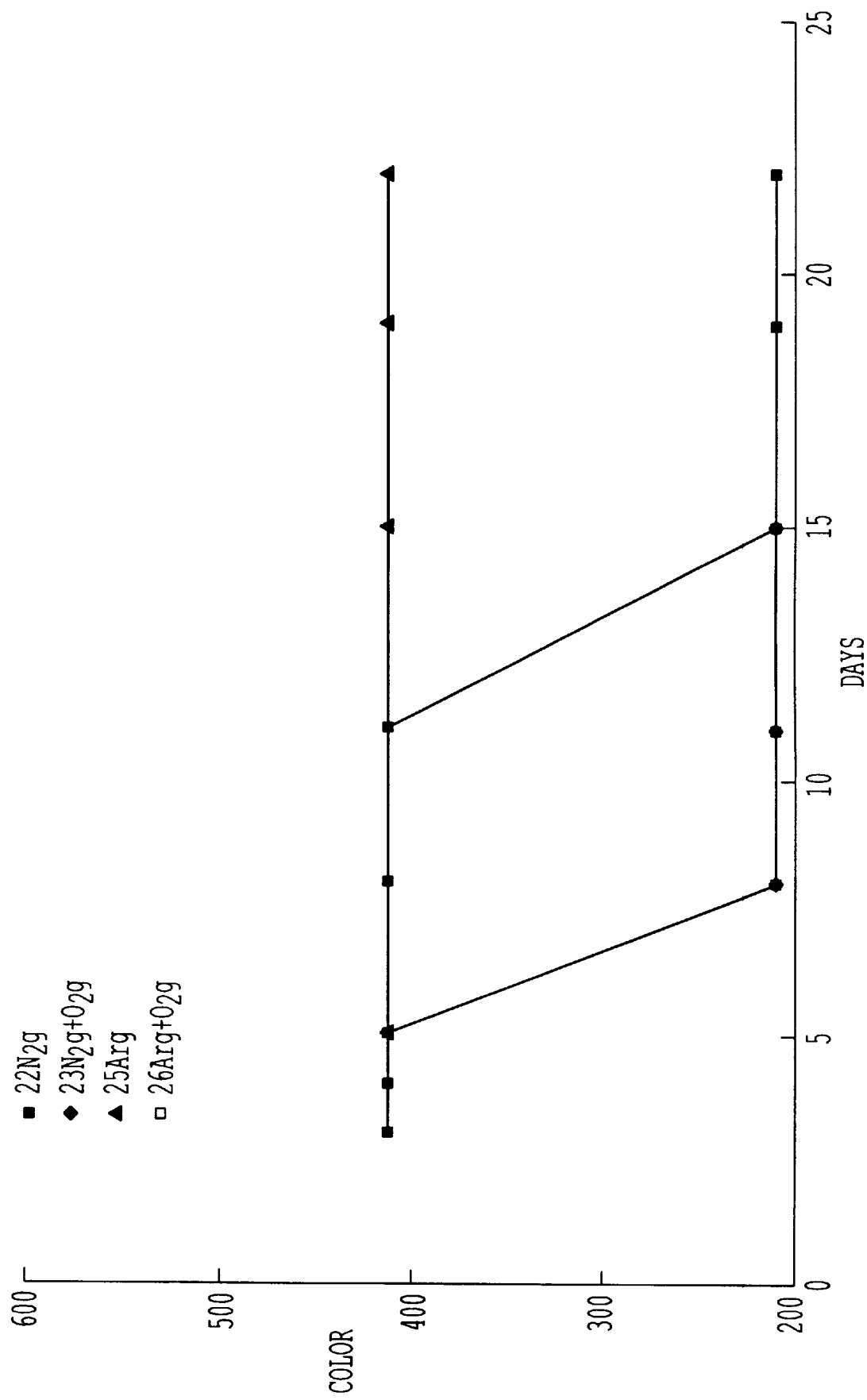
FIG. 5 shows that cryopac meat packaged in argon alone can have better color (scale values) than when 10% oxygen is added. Both argon treatments offer superior color to that found for meat packaged in nitrogen. Further, addition of oxygen to nitrogen offers only very short-term improvement in color, if any (none is shown here). It is noted that argon stabilizes color for up to several months.

From the data in FIG. 5, it may readily be seen that the desirable red color of fresh cut and gas-packaged steak has been preserved for 20–22 days with argon vs. 12–15 days for argon+oxygen, vs. 5–8 days for nitrogen or nitrogen +oxygen. In the experiment represented in FIG. 6, it is seen that where argon preserves color for 30+ days, nitrogen-packaged meat loses color within 4 days, and addition of oxygen extends the nitrogen-packaged meat color a few days but actually decreases the effectiveness of the argon.

FIGS. 1–13 will now be described in more detail.

FIG. 1 clearly shows the degradation of color which occurs in $CO_2$-packaged fresh retail-cut meat. Air also causes degenerative oxidation. However, Aligal 49, due to its increased oxygen content relative to air, causes more degeneration.

Figure 2:
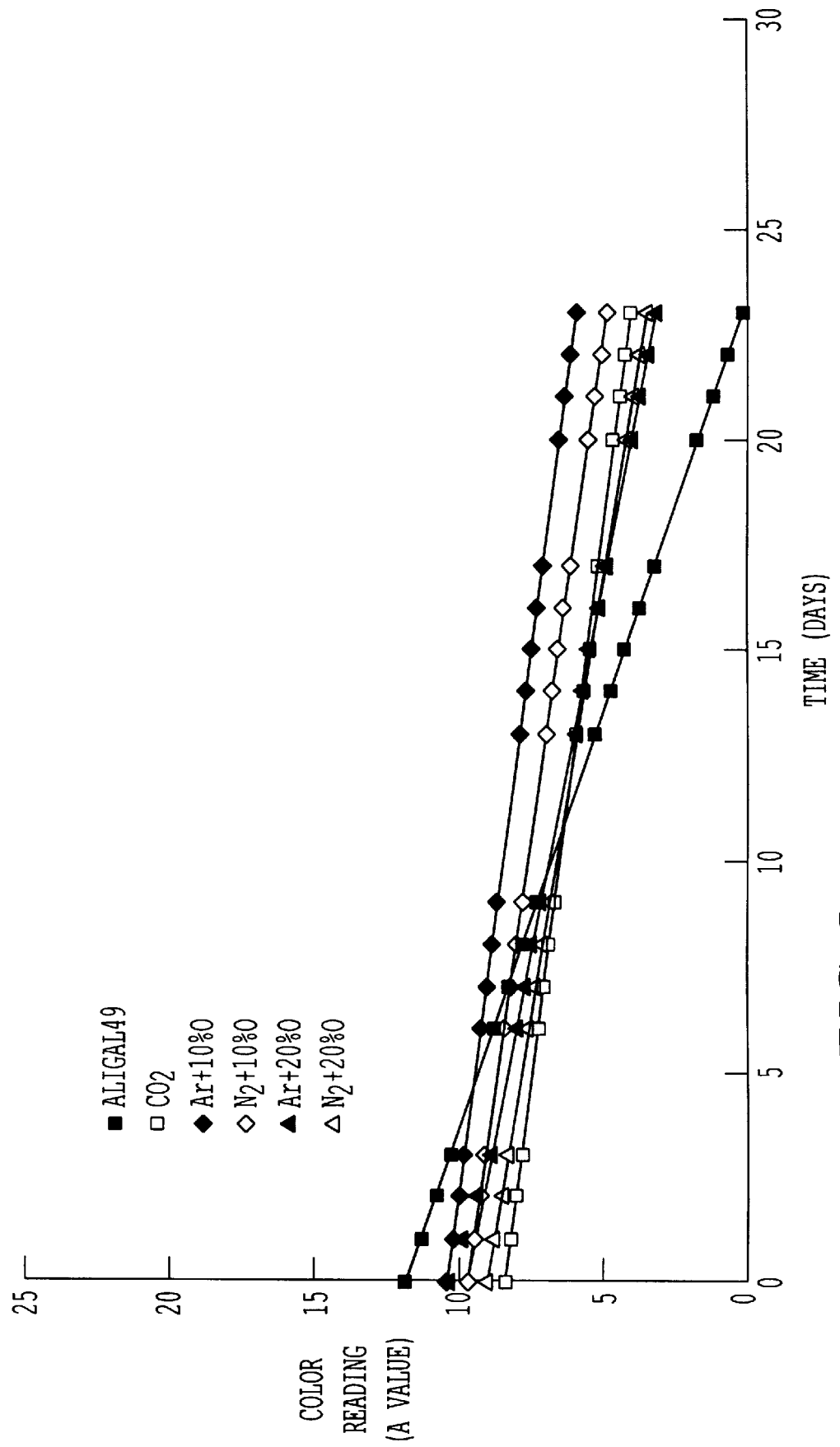
FIG. 2 compares these effects with mixtures of argon or nitrogen plus oxygen or $CO_2$. In both cases, it is seen that argon strongly ameliorates the discoloration of meat caused by $CO_2$ or $O_2$, whereas nitrogen does not. This improvement of color persists for many weeks. (Regressed data).

FIG. 2 illustrates that nitrogen does not ameliorate the discoloration of meat caused by $CO_2$ or $O_2$. It also shows, however, that argon does ameliorate the degenerative oxidative effects of $CO_2$ and $O_2$. Thus, mixtures of argon, $CO_2$ and/or $O_2$ are able to ameliorate degenerative oxidative effects. This improvement of color persists for many weeks.

Figure 3:
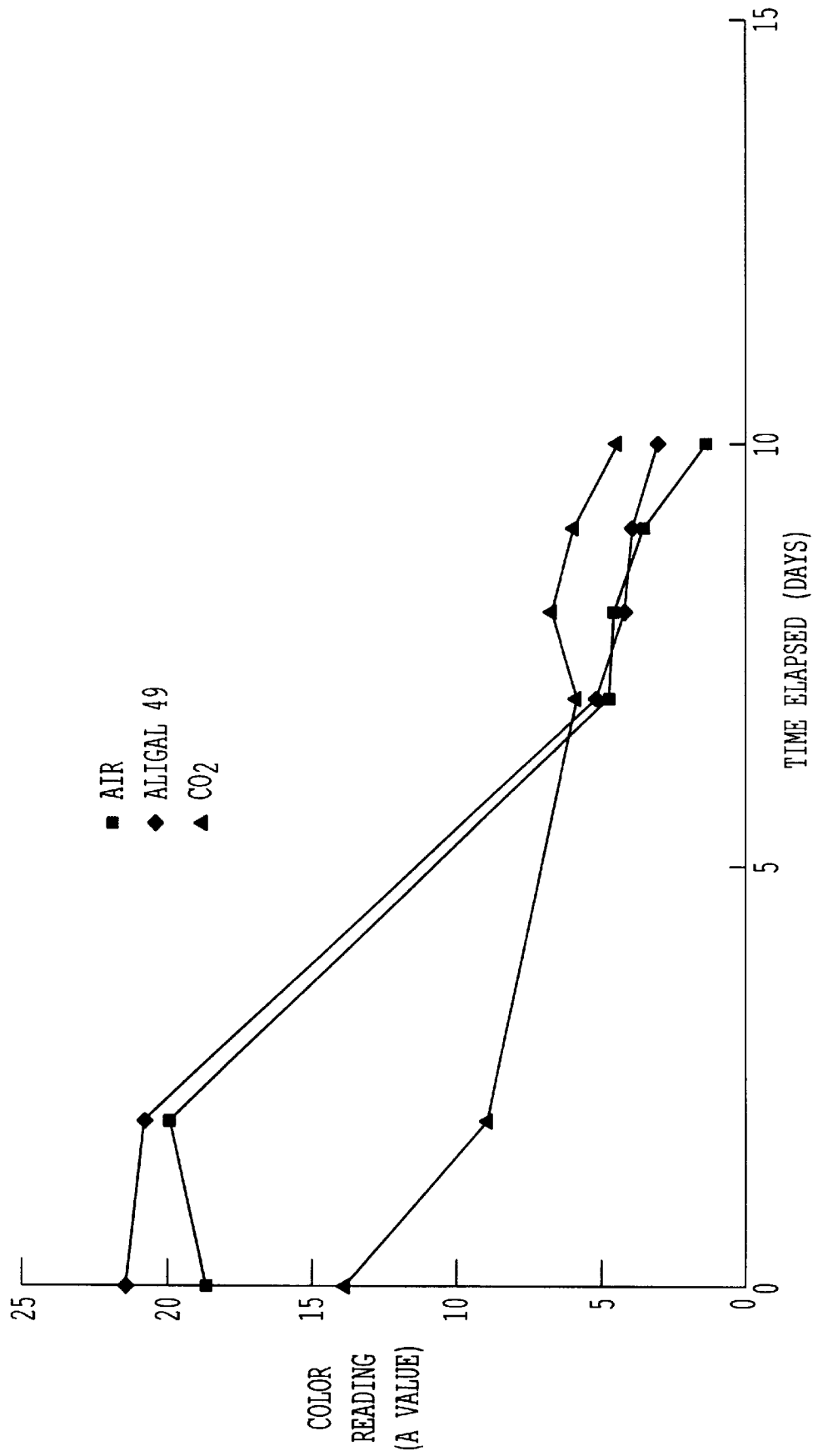
FIG. 3 shows the sharper drop-off in color formed when cryopac meat is saturated in oxygen prior to packaging in these same gases.

FIG. 3 clearly shows the effect that oxygen has on meat discolorations. In particular, the rapid decrease in color quality of cryopac meat is noted when the meat is saturated in oxygen prior to packaging in Aligal 49, $CO_2$ or $O_2$.

Figure 4:
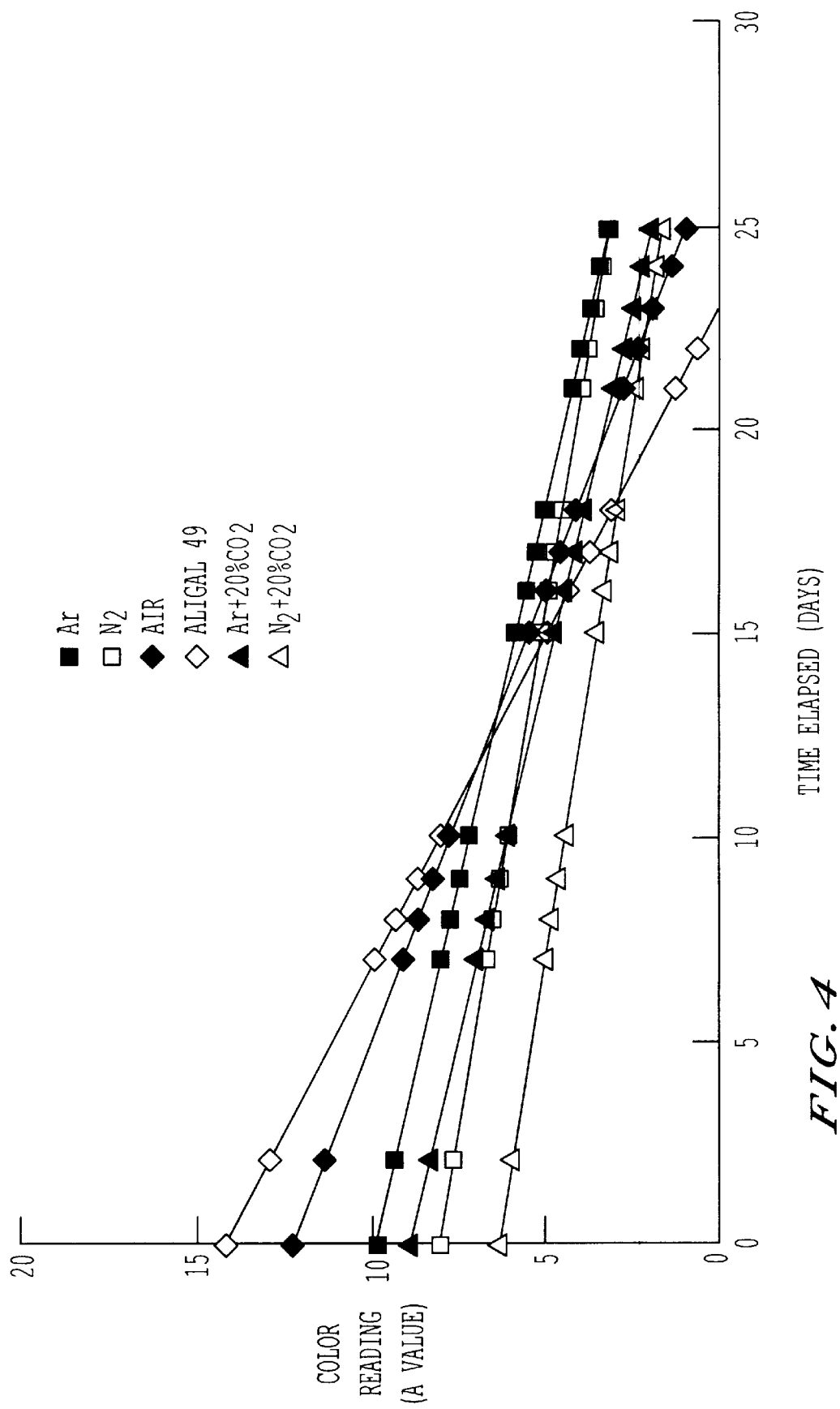
FIG. 4 shows that Ar>$N_2$ and Ar+$CO_2$>$N_2$+$CO_2$ in preserving color (Hunter a) in refrigerated cryopac meat. Argon stabilizes the color well for over one month. (Regressed data).

FIG. 4 illustrates that argon is superior to $N_2$ in preserving red meat color, and that argon in admixture with $CO_2$ is also superior to $N_2$ in admixture with $CO_2$ in preserving red meat color. Argon stabilizes color well for over one month.

FIG. 5 illustrates that argon alone exhibits a superior effect in preserving color, than when a small amount (10%) of oxygen is added thereto, in cryopac meat packages. It is noted, however, that the addition of oxygen to nitrogen affords a very short-term improvement in color. It is noted that argon stabilizes color for up to several months.

Figure 6:
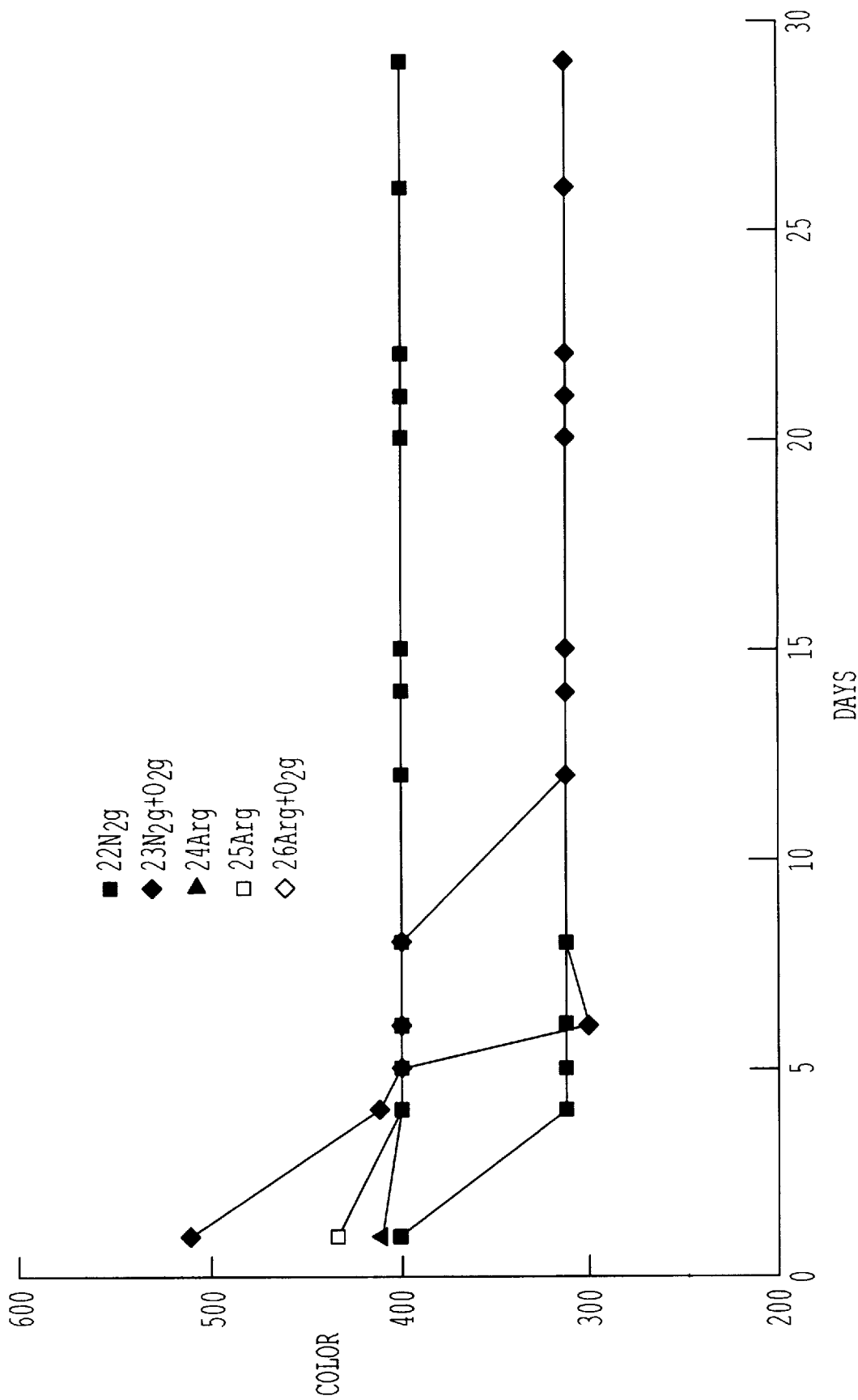
FIG. 6 shows a replicate of the above experiment in which the meat is exposed to mixtures containing more (25%) oxygen. Addition of oxygen is only capable of producing short-term color improvement.

FIG. 6 illustrates that further addition of oxygen, at best, produces short-term color improvement.

Figure 7:
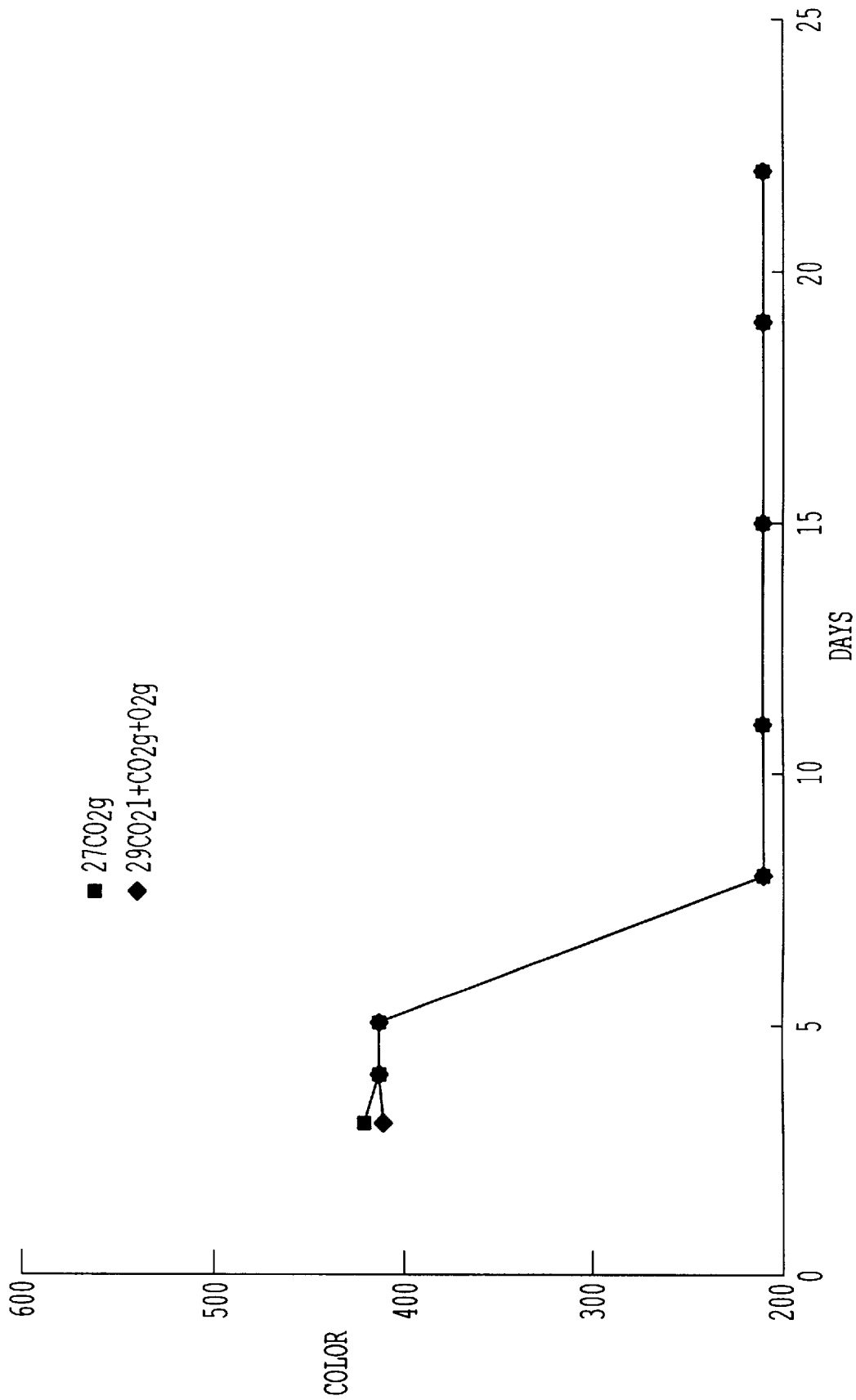
FIG. 7 compares the effect on color (scale) of cryopac meat of gas packaging under $CO_2$ versus cryogenic freezing followed by gas packaging under $CO_2$ plus 10% oxygen. $CO_2$ generally discolors meat.

FIG. 7 illustrates the effect of $CO_2$ in discoloring cryopac meat when gas-packaged thereunder after cryogenic freezing.

Figure 8:
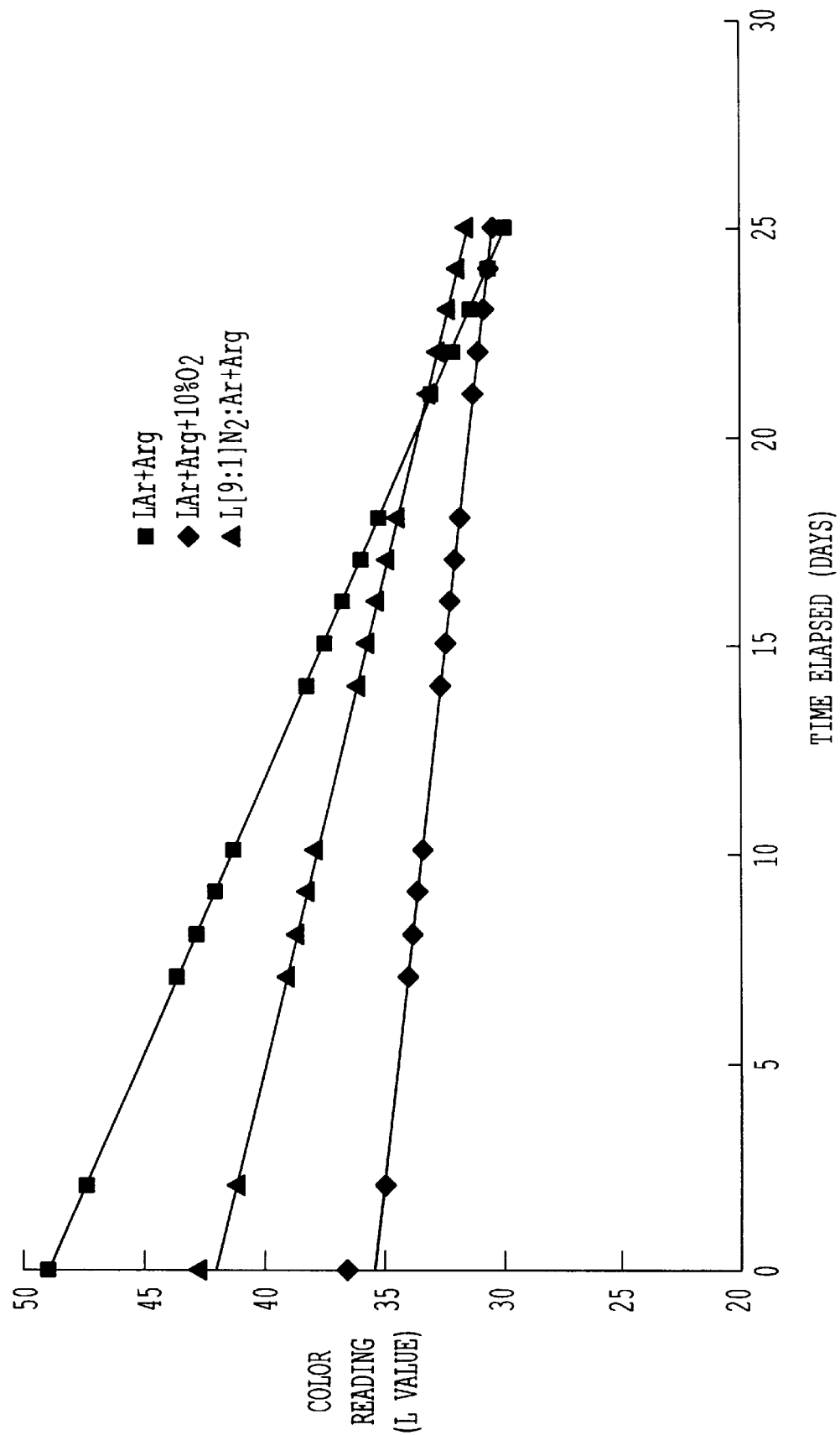
FIG. 8 compares the effect on color (Hunter L) of cryopac meat fresh-cut under nitrogen then cryogenically frozen and packaged. Argon is clearly superior, here providing between color for over 3 weeks. (Regressed data).

FIG. 8 illustrates the superior effect of argon on color of cryopac meat fresh-cut under nitrogen then cryogenically frozen and packaged. Argon provides better color for over 3 weeks.

Figure 9:
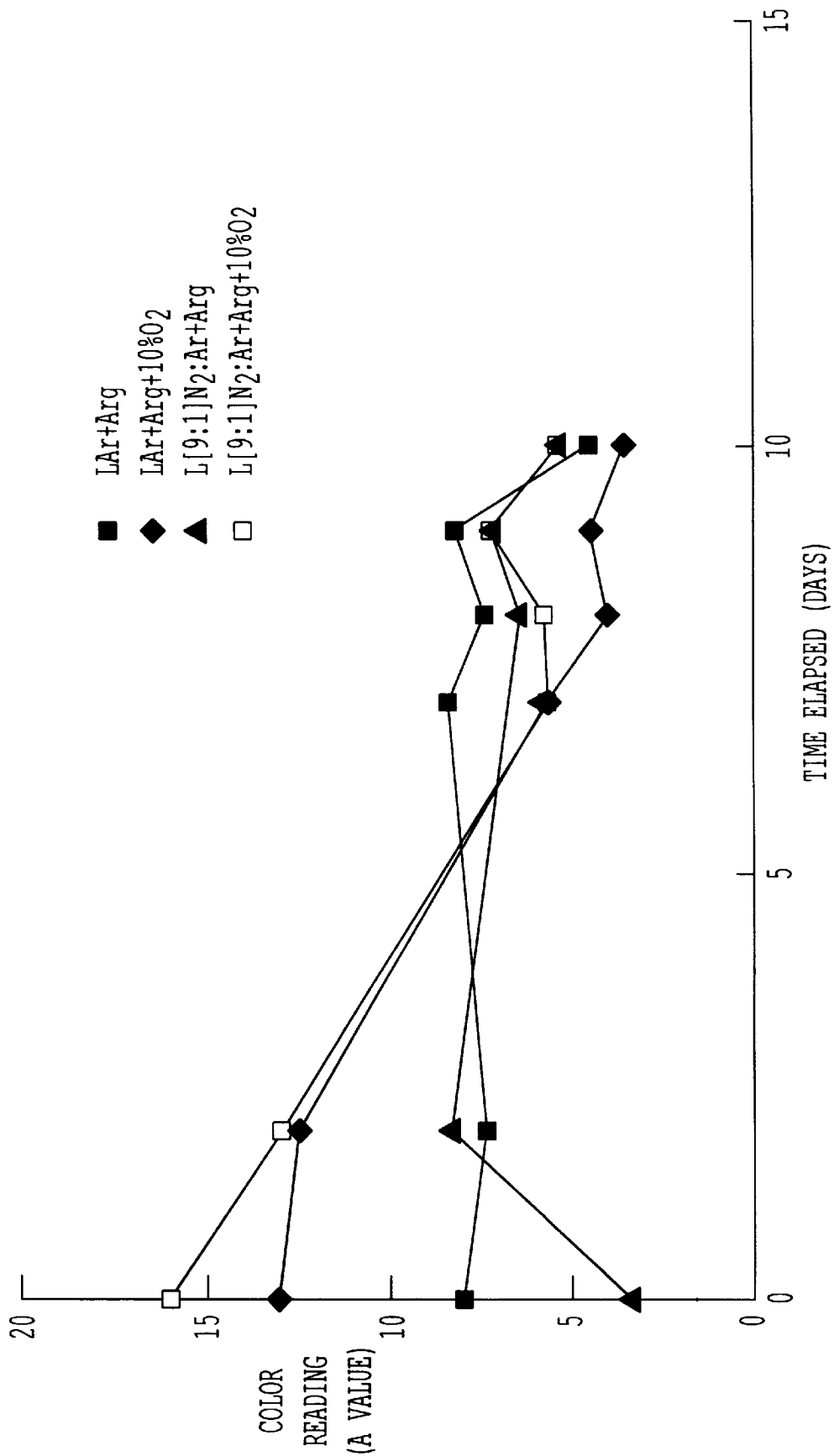
FIG. 9 compares color (Hunter a) of cryopac meat which is fresh-cut under nitrogen and then cryogenically frozen in argon versus 9:1 $N_2$:Ar, then packaged in either argon or argon plus 10% oxygen. It is clear that 9:1 $N_2$:Ar can substitute effectively for argon in cryogenic freezing, and that good color results can be obtained without oxygen. (Regressed data).

FIG. 9 illustrates that 9:1 $N_2$:argon can effectively substitute for argon in cryogenic freezing, and that good color results may be obtained without oxygen.

Figure 10:
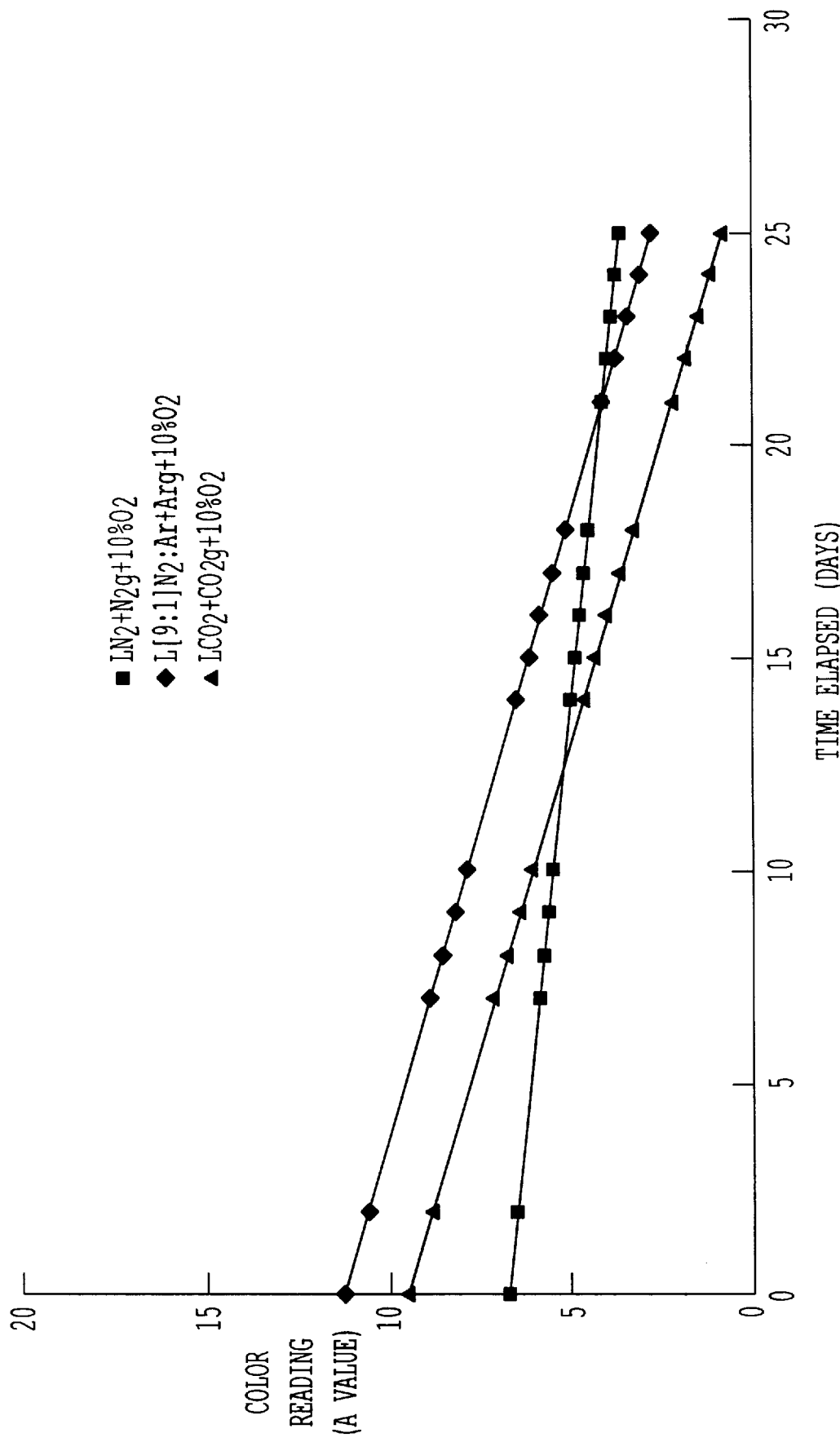
FIG. 10 compares the color (Hunter a) of meat frozen cryogenically and gas-packaged in nitrogen versus 9:1 nitrogen:argon versus $CO_2$. All colors have been enhanced with 10% oxygen. Argon yields higher color values and stabilizes color for many months in the freezer.

FIG. 10 illustrates that cryogenic argon yields very high color values compared to cryogenic nitrogen or $CO_2$ and can stabilize color for many months when meat is kept frozen.

Figure 11:
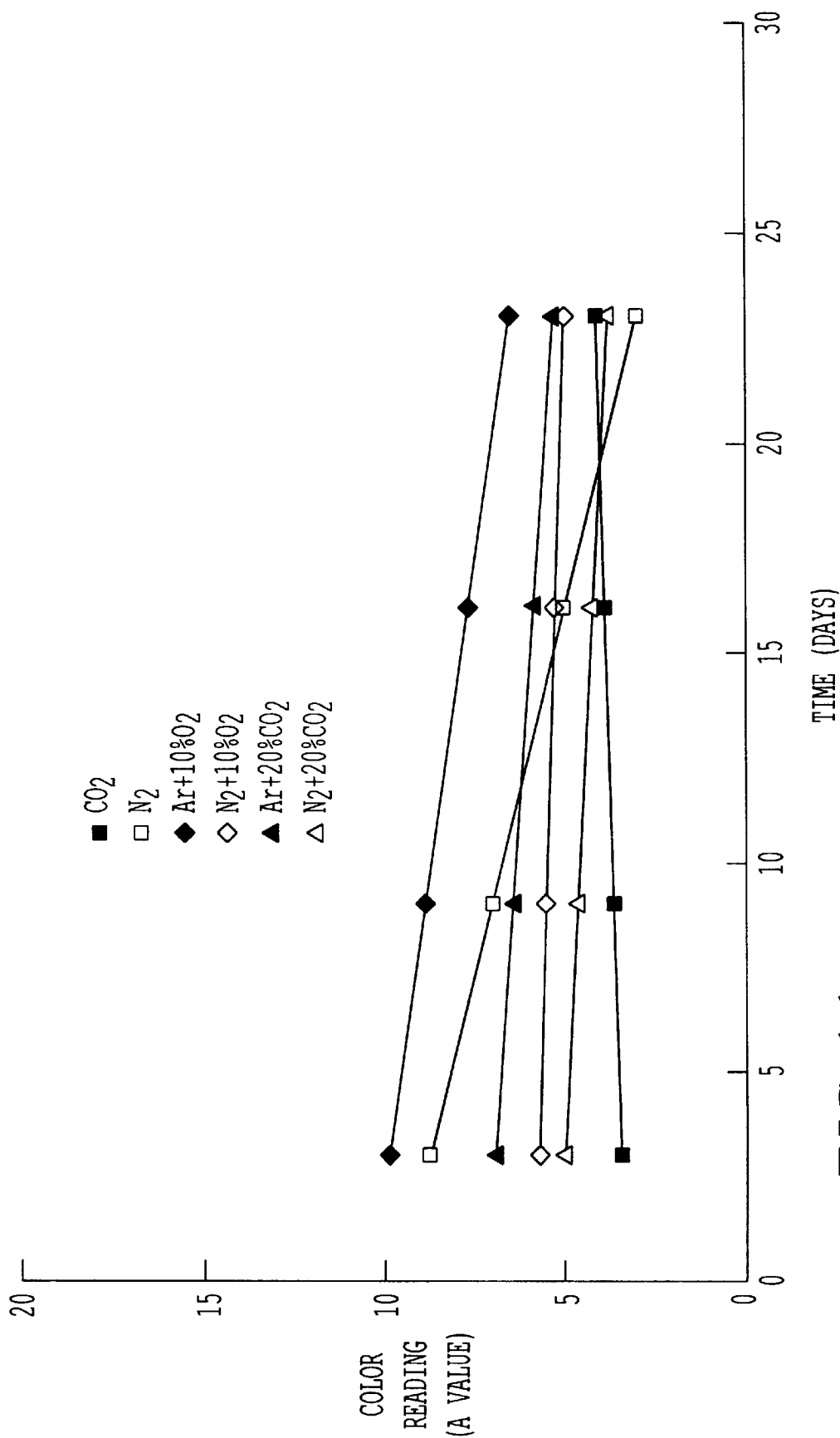
FIG. 11 shows the effect on color (Hunter a) of retail meat frozen mechanically under various atmospheres. Argon offers superior color and color stability even when combined with oxygen or $CO_2$ (regressed data). Color is stable for up to 12 months.

FIG. 11 illustrates the superior color stability provided by argon even when combined with oxygen or $CO_2$.

Figure 12:
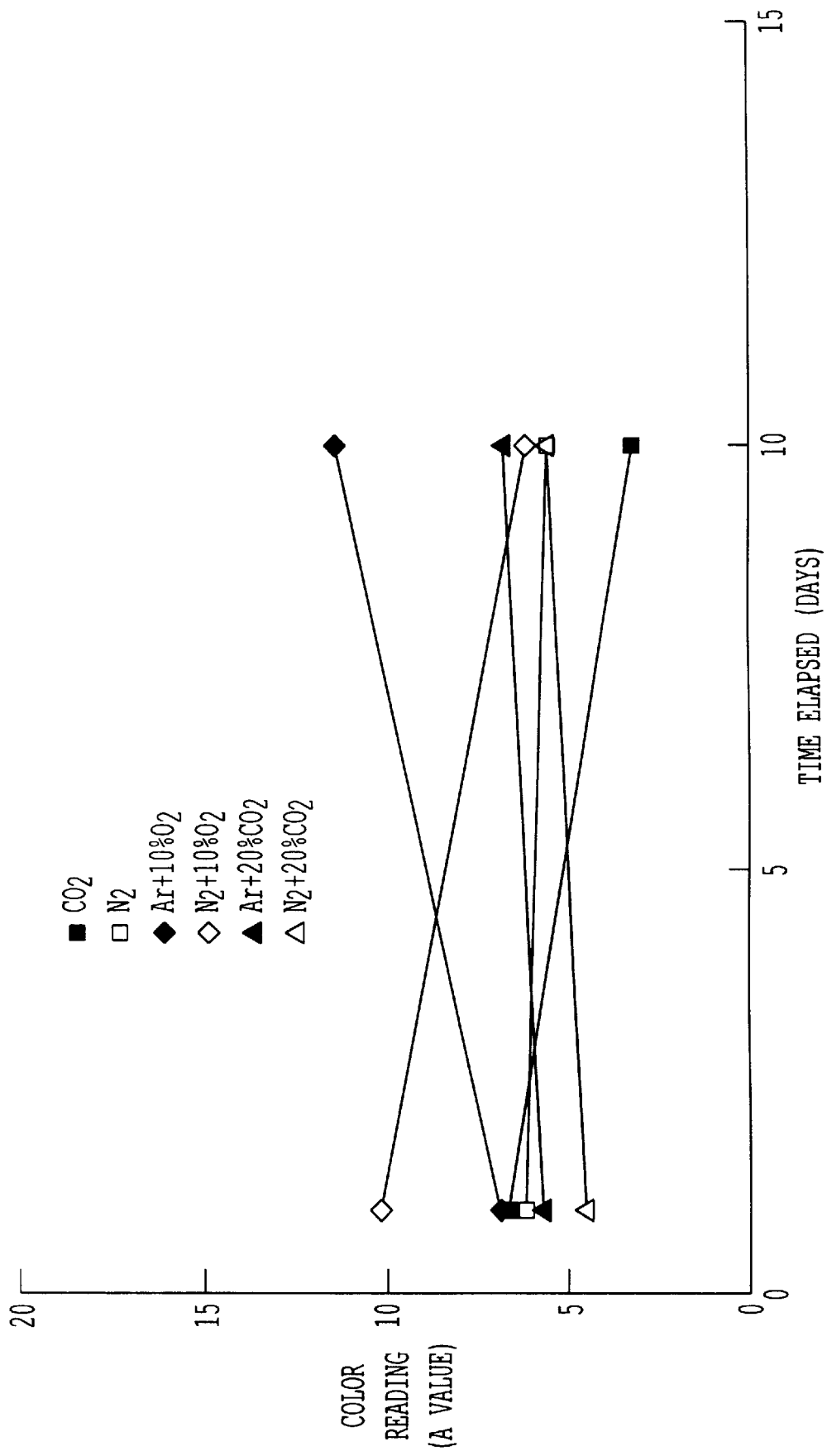
FIG. 12 shows the same results when cryopac meat is fresh-cut under nitrogen—stability is persistent over many months (regressed data).

FIG. 12 illustrates the same results when cyropac meat is fresh-cut under nitrogen, i.e., color stability is persistent for 12 months.

Figure 13:
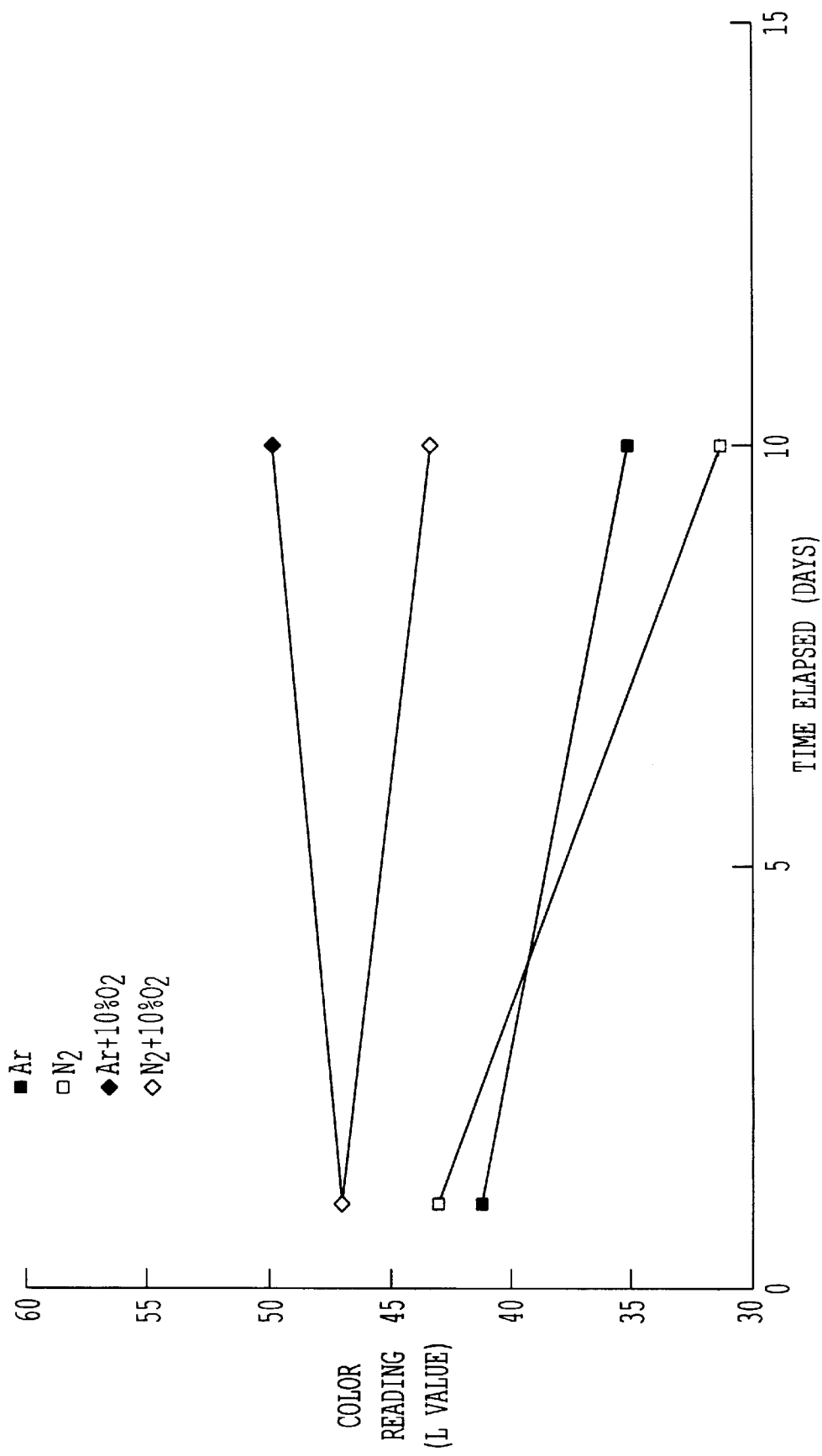
FIG. 13 shows color (Hunter L) stability of similar meat samples frozen mechanically under different atmospheres. Stability persists for up to 12 months (regressed data).

FIG. 13 illustrates the color stability of similar meat samples frozen mechanically under different atmospheres, i.e., color stability persists for 12 months.

Thus, the present invention generally provides a method for preserving the color and quality of red meat or meat products or both, which entails contacting the meat with a noble gas, a mixture of noble gases or a noble gas-containing mixture or any combination thereof, which entails at least one noble gas at a concentration which is greater than the amount normally found in atmospheric air. It is preferred that the noble gas, mixture of noble gases or noble gas-containing mixture contain argon in excess of 1% by volume. It is particularly preferred that the noble gas, mixture of noble gases or noble gas-containing mixture have a noble gas concentration which is substantially greater than 1% by volume. By the term "substantially greater than 1% by volume" is meant generally greater than about 5% by volume, preferably greater than about 10% by volume.

In addition to all of the advantages described above, the present invention is also advantageous in that the use of nitrites, such as sodium nitrite, to impart red color to meat may be avoided.

Having described the present invention, it will apparent to one of ordinary skill in the art that many changes and modifications can be made to the above-described embodiments without departing from the spirit or the scope of the present invention.

What is claimed as new and desired to be secured by Letters Patent of the United States is:

1. A process for preserving the color of red meat, which comprising contacting said meat with an effective amount of an atmosphere of either pure argon or a mixture consisting of ≧70 volume % of argon and a carrier gas selected from the group consisting of carbon dioxide, nitrogen, oxygen and mixtures thereof.

2. The process according to claim 1, wherein said contacting occurs during shipment, aging or long-term refrigerated storage.

3. The process according to claim 2, wherein the container has at least a wall which is semi-permeable to at least one of the gases contained in said container, said semi-permeable wall having a rate of exchange with a surrounding atmosphere, which is favorable for maintenance of the desired atmosphere within the package.

4. The process according to claim 3, wherein the atmosphere is present in gaseous or liquid form or both.

5. The process according to claim 1, wherein a mixture of about 10% by volume liquid nitrogen and 90% by volume liquid argon is used.

6. The process according to claim 1, wherein said meat is contacted with a mixture comprising about 70 to 95 vol % of argon and about 5 to 30 vol % of $CO_2$ or $O_2$ or both.

7. The process according to claim 3, wherein said red meat is selected from the group consisting of beef, veal, lamb and pork.

8. The process according to claim 7, wherein said red meat is beef.

9. The process according to claim 1, wherein said contacting comprises gas packaging of said red meat.

10. The process according to claim 3, wherein said contacting comprises gas shrouding with mechanical freezing.

11. The process according to claim 3, wherein said contacting comprises freezing said red meat in a liquified form of said atmosphere.

12. The process according to claim 3, wherein said contacting is preceded by subjecting said red meat to low pressure by vacuum.

13. The process according to claim 3, wherein said contacting of red meat with said atmosphere occurs coincident with cryogenic freezing wherein boiling liquid from cryogenic freezing of said red meat is used to fill a gas package containing said red meat.

14. The process according to claim 3, wherein said meat is contacted with said atmosphere, the latter being a solution saturated with said atmosphere.

15. The process according to claim 13, wherein said gas is in water or an aqueous-based solution.

16. The process according to claim 3, wherein said contacting occurs during preparation of retail display packages.

17. The process according to claim 3, wherein said contacting occurs during preparation of primal wholesale cuts for storage.

18. The process according to claim 3, wherein said contacting occurs during cryogenic freezing, and whereinafter said red meat is vacuum packaged.

19. The process according to claim 3, wherein said contacting occurs during a processing stage where said red meat is chilled under said atmosphere.

20. The process according to claim 3, wherein said contacting occurs during a processing stage where said red meat is chilled by immersion in a liquid bath.

21. The process according to claim 3, further comprising a step of packaging said red meat in a container.

22. The process according to claim 21, wherein the container is impermeable to at least the noble gas of said atmosphere under which said meat is contacted during a previous processing step.

23. The process according to claim 2, wherein the container is flushed with said atmosphere prior to the introduction of said red meat in said container.

24. The process according to claim 22, wherein the atmosphere used to flush the container contains at least one noble gas identical to the one used during a previous step or steps.

25. The process according to claim 22, wherein the atmosphere used to flush the container contains at least a different noble gas from at least one used during a previous step or steps.

* * * * *

UNITED STATES PATENT AND TRADEMARK OFFICE
CERTIFICATE OF CORRECTION

PATENT NO. : 6,113,962  Page 1 of 1
DATED : September 5, 2000
INVENTOR(S) : Kevin C. Spencer It is certified that error appears in the above-identified patent and that said Letters Patent is hereby corrected as shown below:

<u>Column 13,</u>
Please delete lines 12-17, and insert in lieu thereof
-- 3. The process according to claim 1, further comprising a step of packaging said red meat in a container. --
Line 18, delete "3" and insert -- 1 --.
Line 21, delete "10%" and insert -- 90% --, and delete "90%" insert -- 10% --.
Lines 26, 33, 36, 39 and 42, delete "3" and insert -- 1 -- in each instance.

<u>Column 14,</u>
Lines 4, 9, 12, 15, 18 and 21, please delete "3" and insert -- 1 -- in each instance.
Delete lines 24-25, and insert
-- 21. The process according to claim 1 wherein the container has at least a wall which is semi-permeable to at least one of the gases contained in said container, said semi-permeable wall having a rate of exchange with a surrounding atmosphere, which is favorable for maintenance of the desired atmosphere within the package. --
Line 26, delete "21" and insert -- 3 --.
Line 30, delete "2" and insert -- 3 --.
Lines 33 and 37, delete "22" and insert -- 23 --.

Signed and Sealed this

Eleventh Day of November, 2003

JAMES E. ROGAN
*Director of the United States Patent and Trademark Office*